United States Patent [19]

Bentzen-Bilkvist

[11] 4,264,243

[45] * Apr. 28, 1981

[54] CONSTANT VACUUM BARGE UNLOADING SYSTEM

[75] Inventor: Ib Bentzen-Bilkvist, Ann Arbor, Mich.

[73] Assignee: Dundee Cement Company, Dundee, Mich.

[*] Notice: The portion of the term of this patent subsequent to Apr. 25, 1995, has been disclaimed.

[21] Appl. No.: 829

[22] Filed: Jan. 4, 1979

[51] Int. Cl.³ .............................................. B65G 53/60
[52] U.S. Cl. .................................................. 406/169
[58] Field of Search ............... 406/169, 168, 53, 109, 406/124, 125, 126, 171, 172, 173

[56] References Cited

U.S. PATENT DOCUMENTS

| | | | |
|---|---|---|---|
| 1,369,649 | 2/1921 | Gieseler | 406/169 |
| 2,193,738 | 3/1940 | Perrin | 406/169 |
| 3,454,307 | 7/1969 | Bishop | 406/169 |
| 3,489,464 | 1/1970 | Delfs | 406/109 X |
| 4,019,641 | 4/1977 | Merz | 406/53 X |
| 4,085,975 | 4/1978 | Bentzen-Bilkvist | 406/109 |

FOREIGN PATENT DOCUMENTS 995051 6/1965 United Kingdom ................. 406/124

Primary Examiner—Jeffrey V. Nase
Attorney, Agent, or Firm—Cullen, Sloman, Cantor, Grauer, Scott & Rutherford

[57] ABSTRACT

An unloading system for transferring dry, bulk, particulate material from a ship, barge or the like to a conveyor system and ultimately to a storage silo. The particulate material is continuously transferred from the ship into a first pressure vessel or container which pressure vessel is operated under a constant vacuum or negative pressure. During the filling of the pressure vessel, particulate material is removed from the pressure vessel and sequentially transferred first to a temporary discharge container and then to a conveyor system. The alternating filling and emptying of discharge container continues while the pressure vessel is continuously filled.

3 Claims, 1 Drawing Figure

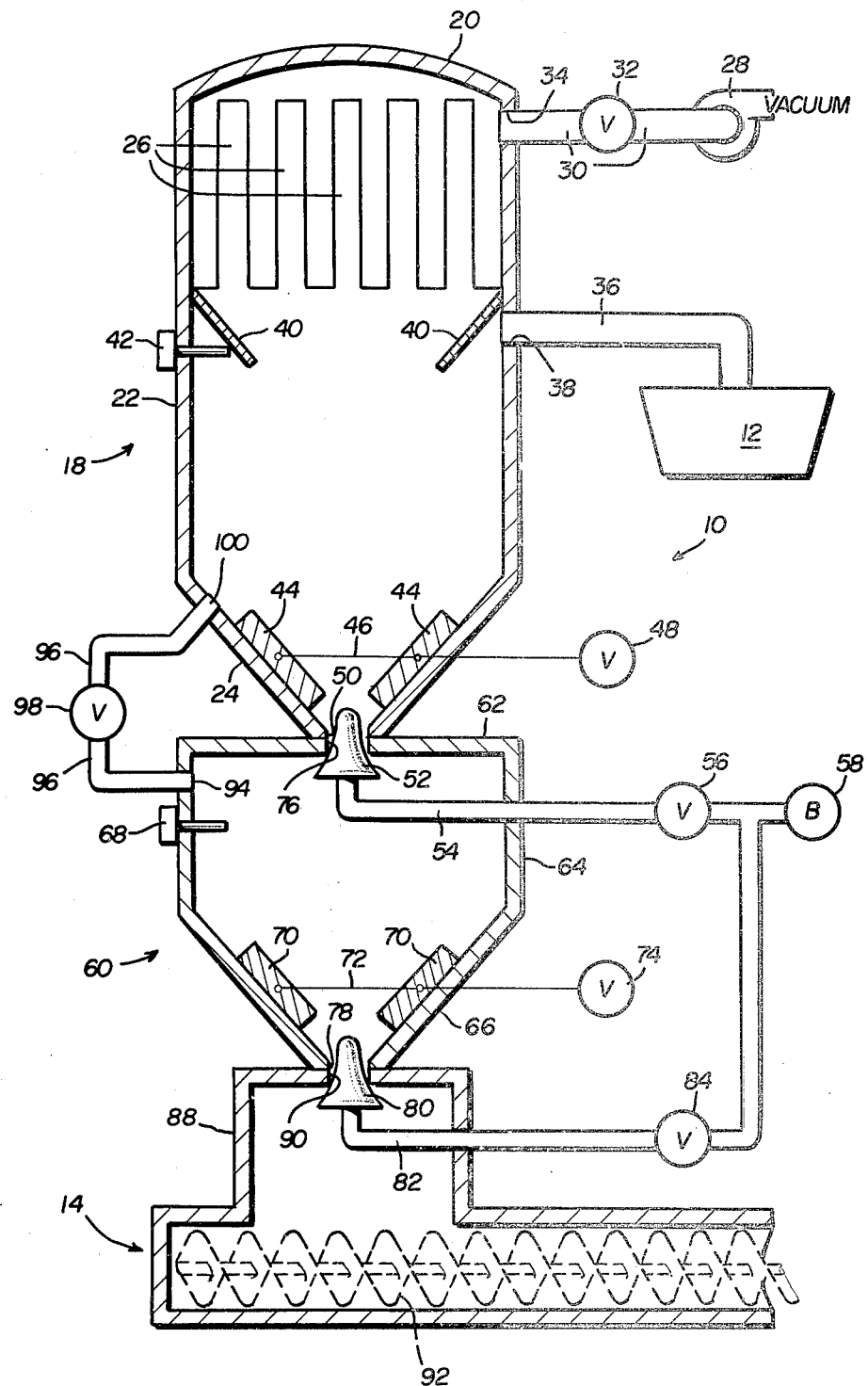

CONSTANT VACUUM BARGE UNLOADING SYSTEM

BACKGROUND OF THE INVENTION

This invention relates generally to an improved system for the vaccum unloading and transferring of dry, bulk, particulate material from a container such as a vessel, a river barge, an ocean-going ship or the like. Systems utilizing a basic vacuum technique to transfer dry, bulk, particulate material are, of course, well-known as described in U.S. Pat. No. 3,373,883 assigned to the assignee of the present invention and entitled "Barge Unloading System".

In the unloading of dry, bulk, particulate material such as cement powder, grain or fertilizer, it is known that the material is fluidized when mixed with a transport medium such as air and thus the material may be conveyed and transported as if it were a fluid material. The actual conveying or transporting of the fluidized particulate material is accomplished by a nozzle connected ultimately to a vacuum pump, to provide suction or negative pressure, as is conventional.

There are, of course, well known vacuum unloading systems. In one such system, described in U.S. Pat. No. 3,373,883, there are two pressure vessels or containers which are alternately filled from the barge. As one vessel is being filled, by suction or negative pressure, the other vessel is being emptied, by a positive pressure or blower, into a permanent storage vessel such as a silo. The equipment used for the system of U.S. Pat. No. 3,373,883 is quite expensive since it requires two complete pressure vessels into which the dry, bulk, particulate materal is initially transferred by vacuum.

To overcome the expense of two pressure vessels, systems have been developed which utilize a singe nozzle system, a single pressure vessel, and the use of constant vacuum or negative pressure to fill the pressure vessel. An exemplification of such a system is found in U.S. Pat. No. 3,489,464, in which system the particulate material itself is utilized to establish a seal between the negative pressure or vacuum at the inlet side of the pressure vessel and the ambient pressure at the outlet side of the pressure vessel. These types of systems require that the level of material in the pressure vessel be maintained substantially constant to provide sufficient material in the pressure vessel to maintain the sealing effect between the negative pressure inside the vessel and the ambient pressure outside the vessel. Hence several types of problems may arise. First, an excessively large discharge of material from the pressure vessel may break the seal between negative pressure and ambient pressure. Second, where there is no more particulate material in the ship or barge, as the pressure vessel is discharged the height of material in the pressure vessel will be insufficient to maintain the seal. Third, the rate of discharge of material from the pressure vessel will not be constant, thus there will be a non-optimum, inefficient use of the conveying means which transfers the particulate material from the pressure vessel to a storage silo.

Yet another technique for particulate transfer according to the prior art is exemplified by Swiss Pat. No. 376,430 which shows upper and lower containers for an unloading apparatus. The Swiss patent does not disclose how the particulate material is initially introduced into the upper container. The material is transferred from the upper container to a lower container apparently under the influence of gravity and, thereafter, air is introduced into the lower container to pressurize the lower container and thus force the particulate material out of the lower container.

The present invention overcomes the problems of the prior art by providing a new and improved method and apparatus for unloading dry, bulk, particulate material using only a single nozzle system and a single pressure vessel, without the problem of maintaining a seal between the pressure vessel and the ambient air, and without the need for positive pressure to transfer material from the system to a silo or permanent storage device.

SUMMARY OF THE INVENTION

Thus the present invention relates to a system, method and apparatus for unloading dry, bulk, particulate material from a ship, barge, or the like and depositing the particulate material on a conveyor system including continuously transferring the particulate material by suction or negative pressure from the barge, ship or the like into a first pressure vessel or reloader and thereafter sequentially transferring some of the material from the pressure vessel to a temporary discharge container and thereafter transferring the material from the discharge container to the conveyor system, with transfer of material from the pressure vessel to the discharge container and the transferring of material from the discharge container to the conveyor continue in alternating time sequence while the pressure vessel is continuously filled under negative pressure.

Furthermore, the present invention is directed to an improved method, apparatus and system for unloading dry, bulk, particulate material from a barge, ship or the like and transferring such material to a conveyor system including transferring the material by suction means to a reloader, with the reloader being constantly under a vacuum or negative pressure, emptying a part of the contents of the reloader into a discharge container while continuing to fill the reloader, and thereafter emptying the contents of the discharge container onto the conveyor while continuing to fill the reloader.

The present invention further includes a system, apparatus and method for aerating the dry, bulk, particulate material as it enters the reloader and thereafter re-aerating the dry, bulk, particulate material as it enters the discharge container, the aerating for fluidizing the material to facilitate movement of the particulate material.

The present invention further contemplates the emptying of the reloader into the discharge container at atmospheric pressure, i.e., with no pressure differential between the reloader and the discharge container and furthermore emptying the discharge container into the conveyor system at atmospheric pressure, i.e., with no pressure differential between the discharge container and the conveyor system.

The present invention further contemplates the equalizing of the pressure between the pressure vessel or reloader and the discharge container just before transferring the contents from the reloader into the discharge container to avoid a reverse flow of particulate material.

BRIEF DESCRIPTION OF THE DRAWINGS

The foregoing objects and advantages of the present invention, together with other objects and advantages which may be attained by its use, will become more apparent upon reading the following detailed description of the invention taken in conjunction with the drawings.

In the drawings:

The single FIGURE is a front elevation view, partly in section and partly diagrammatic, of the present invention.

DETAILED DESCRIPTION OF THE DRAWINGS

With reference to the single FIGURE of drawings, there is illustrated the system 10 of the present invention for transferring dry, bulk, particulate material such as cement powder, grain, fertilizer or the like through a nozzle 12 and through the system 10 into a conveyor means 14.

The nozzle may be one of many types well known for the vacuum or suction transferring of these types of dry, bulk, particulate materials as, for example, exemplified in U.S. patent application Ser. No. 898,849, filed Apr. 21, 1978 U.S. Pat. No. 4,195,954 and assigned to the assignee of the present invention. The nozzle per se may be any one of the conventional nozzles already available and is not considered a part of the present invention but is a part of the environment in which the invention may be practiced.

The system 10 includes a first pressure vessel 18 known as a reloader of the type described in U.S. Pat. No. 4,085,975 assigned to the assignee of the present invention. The reloader 18 is a generally cylindrical container having a domed top 20, a generally vertical side wall 22 and a conical bottom 24. The reloader 18 is generally circular in the plan view and includes, at the top portion thereof, a plurality of dust collector bags 26 as described in the aforementioned U.S. Pat. No. 4,085,975. The use of dust collector bags, which is conventional, will be briefly described with respect to the operation of the present system.

The system 10 further includes a source of vacuum, such as a vacuum pump 28 connected by a conduit 30, which conduit includes a control valve 32, to an inlet port 34 at the top of the side wall of the pressure vessel or reloader 18. When the dry, bulk, particulate material is being introduced into the reloader, it enters from the suction nozzle 12 through a conduit 36, which is deposited in the reloader at an inlet port 38 in the side wall 22 of the reloader. The pressure vessel functions as a conventional cyclone separator with an internal conical baffle 40, so that as the particulate material enters the reloader the particulate material is separated from the fluidizing medium. The particulate material falls downwardly into the pressure vessel or reloader while the fluidizing medium is removed through the dust collector bags 26 and via conduit 30 to the vacuum pump 28.

As is conventional with this type of equipment, a high level detector 42 is provided to signal when the level of dry, bulk, particulate material in the reloader 18 reaches the height of the high level detector.

Along the conical bottom wall 24 of the pressure vessel or reloader, there is provided a porous aeration pad 44 connected along a conduit 46 and through a valve 48 to ambient air. The porous pad as illustrated may be of the type disclosed in French Pat. No. 1,330,566 or French Pat. No. 1,230,526 or in any of a number of other patents disclosing the use of a porous aeration pad. In addition, the aeration pad may be replaced by the type of aeration apparatus disclosed in the aforementioned U.S. Pat. No. 4,085,975.

An outlet port 50 for the pressure vessel or reloader 18 is located at the bottom of the pressure vessel and is opened or closed by the movement of a cone valve 52. The cone valve is connected along a conduit 54 through a valve 56 to a blower or source of positive air pressure 58. The cone valve per se is of the type manufactured by the Cyclonaire Corporation.

Immediately below the reloader or pressure vessel 18 is a temporary discharge container 60 which is of generally circular cross-section in plan view and includes a flat top 62 and a vertical side wall 64. The side wall is tapered at its bottom to form a conical bottom 66. The discharge container also includes a high level detector 68 to provide a signal when the level of the dry, bulk, particulate material reaches the high level detector.

The second or temporary discharge container also includes a porous aeration pad 70 along its conical bottom 66 which is connected by a conduit 72 through a valve 74 to the ambient air. Again, alternate forms of aeration apparatus, such as the type disclosed in U.S. Pat. No. 4,085,975, may be utilized.

The temporary discharge container 60 has an upper inlet port 76 positioned directly vertically beneath the outlet port 50 of the pressure vessel or reloader 18 which inlet port 76 is also opened and closed by the cone valve 52. When the cone valve is moved vertically downward, it opens the outlet port 50 of the pressure vessel and simultaneously opens the inlet port 76 of the second container to allow the dry, bulk, particulate material to flow from the pressure vessel or reloader 18 into the second container 60. Closing cone valve 52 simultaneously closes both the inlet port 76 of the discharge container and outlet port 50 of the pressure vessel.

The second container 60 has an outlet port 78 at the bottom of the conical wall 66 and the outlet port 78 is also opened and closed by a cone valve 80. The cone valve 80, which is the same type as the cone valve 52, is connected through a conduit 82 and a valve 84 to the blower or source of positive air pressure 58.

Located directly beneath the discharge container 60 is the conveyor means 14 which has a housing generally designated as 88 and an inlet port 90 at the top thereof in registry with the outlet port 78 of the second container. Closing the cone valve 80 simultaneously closes ports 78 and 90 while opening cone valve 80 simultaneously opens ports 78 and 90.

The conveyor means 14 is illustrated as being a screw conveyor 92 which is a conventional feed mechanism for the transporting of dry, bulk, particulate material. In lieu of a screw conveyor, a conventional belt conveyor may also be utilized.

The system of the present invention also includes a pressure equalizing means between the first or pressure vessel 18 and the discharge container 60. Specifically, the discharge container 60 includes a port 94 extending through the side wall 64 adjacent the flat top 62. This port is connected through a conduit 96 and through a valve 98 to a port 100 in the conical bottom 24 of the pressure vessel or reloader 18.

The foregoing is a description of the component parts of the system and of the environment in which the system of the present invention is utilized. The operation of the system will now be explained.

When it is desired to start the system, the blower 58 is actuated and valves 84 and 56 are opened to close the cone valves 80 and 52, respectively. Valve 74 to the porous pads in the discharge container is closed and valve 48 to the porous pads in the reloader 18 is closed and valve 98 in the pressure equalizing means is also closed. Valve 32 is opened and the source of vacuum 28 is actuated to create a negative pressure or vacuum within the pressure vessel or reloader 18. The negative pressure in the pressure vessel creates a suction through the conduit 36 and nozzle 12 to draw the dry, bulk, particulate material up through the nozzle 12 and along the conduit 36 and into the port 38. The particulate material is thus discharged into the interior of the pressure vessel or reloader 18. As the material starts to fill the pressure vessel, the valve 48 is opened to permit ambient air to be introduced through the porous aeration pad 44 to aerate the material within the pressure vessel 18. The pressure vessel or reloader, in the present invention, has a capacity of approximately 170 cubic feet and is operable to receive approximately 300 tons of dry, bulk, particulate material per hour. Should the height of dry, bulk, particulate material reach the height of the level detector 42 a suitable signal is generated via conventional electric means, not shown, to warn the operator of the apparatus that the material has reached a high level and that material should be discharged from the pressure vessel.

However before the material reaches the height of the level detector 42, the next aspect of the present invention is to discharge a portion of the contents from the pressure vessel into the discharge container 60. To accomplish this, valve 98 is opened and a pressure equalization takes place with the ambient air in the second container 60 exiting from port 94 along conduit 96 and through port 100 into the pressure vessel or reloader 18 to equalize the pressure in the two containers 18 and 60. Thereafter, valve 56 is closed causing the cone valve to drop vertically downward opening the outlet port 50 from the pressure vessel or reloader 18 and opening the inlet port 76 to the container 60 so that the dry, bulk, particulate material flows, by gravity and without any pressure differential into the discharge container 60. During the filling of the discharge container, the valve 74 is open so that ambient air flows through line 72 and through the aeration pad 70 to aerate and fluidize the particulate material as it is entering the discharge container 60. Once the second container is full, valve 56 is opened and the pressure or air from the blower 58 serves to close the cone valve 52 and thus close the exit port 50 from the pressure vessel or reloader 18 and the entrance port 76 for the second container 60. At this time, the pressure equalization means is deactivated by closing the valve 98. The capacity of the second container 60 is about 39 cubic feet or about 23 percent of the capacity of the pressure vessel or reloader 18. Filling of the discharge container 60 occurs at the rate of 400 tons per hour.

While the dry, bulk, particulate material is being transferred into the discharge container 60, more dry, bulk, particulate material is being introduced through nozzle 12 and conduit 36 into the pressure vessel 18 at the entrance port 38 and the source of vacuum or suction is maintained. Thus there is a constant negative pressure being maintained in the pressure vessel. The relative size of the outlet port 50 and the inlet port 76 is such that approximately 400 tons per hour of the dry, bulk, particulate material can be dispensed from the pressure vessel or reloader 18 to the discharge container 60. In other words, the container 60, notwithstanding its smaller volume, can accept the dry, bulk, particulate material at a flow rate faster than the rate at which the dry, bulk, particulate material is introduced into the reloader 18.

Once the discharge container 60 has been filled, and certainly no later than when the level of dry, bulk, particulate material reaches the high level detector 68, the next aspect of the invention is the transferring or discharging the dry, bulk, particulate material to the conveyor means 14. This discharge from container 60 is alternate in time from the discharge of the dry, bulk, particulate material from the pressure vessel 18 into the container 60.

Referring again to the emptying of the discharge container 60, this is accomplished by closing valve 84 to cause the cone valve 80 to drop downwardly thus opening the exit port 78 of the discharge container 60 and opening the entrance port 90 for the conveyor means 14. It is to be noted that prior to closing valve 84, valve 98 has been closed and valve 56 and 74 have been opened. The dry, bulk, particulate material thus falls under gravity and ambient pressure, i.e., without pressure differential from the discharge container 60 into the conveyor means 14. Again, the relative size of the openings 78 and 90 have a flow capacity of 400 tons per hour, which is greater than the flow rate at which the reloader will be filled thus preventing the system from backing up and becoming jammed with an over-full condition. The screw feeder or screw conveyor 92 operates, at a rate of at least 300 tons per hour, to transfer the dry, bulk, particulate material which enters the housing 88 to a permanent storage silo.

It should be noted that all during the time that the discharge container 60 is being filled and furthermore all during the time that the discharge container 60 is being emptied during the filling of the conveyor means, there is a constant flow of dry, bulk, particulate material into the pressure vessel 18 through the entrance port 38 and a constant vacuum maintained in the pressure vessel.

Once the discharge container 60 has been emptied, the ports 78 and 90 are closed, the ports 50 and 76 are opened, the pressure is equalized between the reloader 18 and the discharge container 60 and the dry, bulk, particulate material is discharged from the pressure vessel or reloader 18 to the discharge container 60.

Thus it may be appreciated that there is a continuous flow of the dry, bulk, particulate material into the pressure vessel or reloader 18 and the alternating transfer of material from the pressure vessel 18 to the discharge container 60 and thereafter from the discharge container 60 to the conveyor means 14. Thus there is alternate filling and emptying of the discharge container 60 during continuous filling of reloader 18.

The foregoing is a complete description of the present invention. Many changes may be made without departing from the spirit and scope of the present invention. The invention, therefore, should be limited only by the following claims.

What is claimed is:

1. In a method for unloading dry, bulk, particulate material from a ship, barge or the like by suction and transferring the material to a conveyor means comprising the steps of:

continuously transferring said material by suction from the barge, ship or the like into a pressure vessel, the pressure vessel being under constant vacuum;

emptying a part of the contents of said pressure vessel into a discharge container while continuing to transfer additional material from the ship into said pressure vessel; and emptying the contents of said discharge container onto said conveyor means while continuing to transfer additional material from the ship into said pressure vessel;

said step of emptying a part of the contents of said pressure vessel and the step of emptying the contents of said discharge container being repeated in alternating sequence, the improvement comprising the steps of:

introducing outside ambient air into said pressure vessel through a first valve means which is connected to aerating pads mounted within said pressure vessel while continuing to transfer material into said pressure vessel;

transferring internal air only through a pressure equalizing means connected between said pressure vessel and said discharge container for equalizing the pressure between said pressure vessel and said discharge container prior to said step of emptying a pair of the contents of said pressure vessel into said discharge container; and introducing outside ambient air into said discharge container through a second valve means which is connected to aerating pads mounted within said discharge container during the filling of said discharge container and prior to the emptying of the contents of said discharge container onto said conveyor means.

2. The invention as defined in claim 1 wherein the step of emptying the discharge container occurs under the influence of gravity and without a pressure differential between said discharge container and said conveyor means.

3. In an apparatus including a source of vacuum for unloading dry, bulk, particulate material from a ship, barge or the like, by suction into a pressure vessel and for transferring the material to a conveyor means comprising:

a discharge container positioned to receive material from said pressure vessel;

first means for transferring a part of the contents of said pressure vessel into said discharge container;

said discharge container also positioned to transfer material to said conveyor means; and second means for transferring the contents of said discharge container to said conveyor means;

said source of vacuum for continuing to transfer material into said pressure vessel during said transfer of material into said discharge container and during said transfer to said conveyor means, the improvement comprising:

first outside air inlet means including a valve means which is connected to aerating pads mounted within said pressure vessel to selectively permit ambient air to be introduced into said pressure vessel through said pads to aerate the material within the pressure vessel while continuing to transfer material into said pressure vessel;

pressure equalizing means for transferring internal air only between said pressure vessel and said discharge container for equalizing the pressure therebetween prior to transferring a part of the contents of said pressure vessel into said discharge container, said pressure equalizing means including a conduit and a valve means mounted within said conduit; and second outside air inlet means including a valve means which is connected to aerating pads mounted within said discharge container to selectively permit ambient air to be introduced into said discharge container through said pads to aerate the material entering said discharge container prior to transferring the contents of said discharge container to said conveyor means.

* * * * *